United States Patent

[11] 3,628,797

[72] Inventor Itsuki Ban
829, Higashi-Oizuimachi, Nerima-ku, Tokyo, Japan
[21] Appl. No. 38,704
[22] Filed May 19, 1970
[45] Patented Dec. 21, 1971
[32] Priorities May 21, 1969
[33] Japan
[31] 44/38718;
May 21, 1969, Japan, No. 44/38719

[54] TAPE-CARTRIDGE-POSITIONING APPARATUS
9 Claims, 3 Drawing Figs.

[52] U.S. Cl. .... 274/4 B
[51] Int. Cl. .... G11b 5/00
[50] Field of Search .... 179/100.2 Z; 274/4 A, 4 B, 4 C, 4 D, 11 A, 11 B, 11 C, 11 D, 11 E

[56] References Cited
UNITED STATES PATENTS

| | | | |
|---|---|---|---|
| 2,868,891 | 1/1959 | Brewster | 274/4 E X |
| 3,126,162 | 3/1964 | MacKenzie | 274/4 F X |

*Primary Examiner*—Harry N. Haroian
*Attorney*—Jacobs & Jacobs

ABSTRACT: A tape-cartridge-positioning apparatus for an endless magnetic tape cartridge player, comprising a cartridge moving lever engageable with a tape cartridge laterally insertable into a player housing for moving the cartridge from a nonplay position into a play position and back into the nonplay position, a tension spring biasing the cartridge moving lever in the direction where the cartridge is moved from the play position to the nonplay position, a stopper means retaining the cartridge moving lever in a predetermined first position or second position against the bias of the tension spring, a control means for controlling operation of the stopper means, and a lever moving means for moving the lever into the second position against the bias of the tension spring by use of rotational force of a capstan for running the tape in response to disengagement of the stopper means from the cartridge moving lever in the first position whereby the cartridge is moved from the nonplay position to the play position when the cartridge moving lever is moved to the second position whereas the cartridge is held in the play position and played during the time that the lever is retained by the stopper means in the second position.

INVENTOR

BY

ATTORNEY

TAPE-CARTRIDGE-POSITIONING APPARATUS

BACKGROUND OF THE INVENTION

This invention relates to an endless magnetic tape cartridge player, and more particularly to a novel tape-cartridge-positioning apparatus for automatically positioning an endless magnetic tape cartridge insertable in the player in a play position and for automatically moving the cartridge from the play position into the nonplay position when the play of the cartridge is ended.

A conventional tape cartridge player is arranged so that the cartridge to be inserted in the player is located in the play position by use of a notch formed on the sidewall of the endless magnetic tape cartridge. In this instance, the player is provided with a retention roller which is received in the notch on the cartridge. The retention roller is caused to press the inclined wall of the notch under the influence of a spring, however, less bias of the spring does not obtain enough abutment force between a pinch roller thereby resulting in lack of stability of the tape running speed to produce wow-flatter which deteriorate the tone quality to be reproduced. A stronger resilient force requires more power when the cartridge is taken out of the player for ending the play of the cartridge. As described above, disadvantage derived from the use of the cartridge-positioning apparatus in a conventional tape cartridge player is that more power is required to effect insertion and withdrawal of the cartridge if the cartridge is stably located in the play position whereas when less power is required, the cartridge is not stably located in the play position to deteriorate the tone quality to be reproduced. Further, the cartridge to be used to such one that is provided with a certain notch formed in a certain position. This is thus very inconvenient for the user with respect to its convertibility. In addition, according to the conventional arrangement, the cartridge is longitudinally inserted in the play position in the player housing to cause the rear edge of the cartridge to project from the front panel of the play thereby injuring on human body. For this reason, to mount such the cartridge on a vehicle or the like is not desirable. The cartridge player of the type which longitudinally receive the cartridge in the play position in the player, is adapted to locate a magnetic head adapted to transduce the tape in the innermost position in the player housing so that it is very difficult to check and wipe out a spot or stain on the magnetic head. For cleaning such spot, a specific tool is required to render inconvenient.

The inventor has succeeded in obtaining a novel tape-cartridge-positioning apparatus which enable the cartridge to be laterally inserted in the player housing thereby overcoming the aforementioned shortcoming.

SUMMARY OF THE INVENTION

It is a primary object of the invention to provide a tape-cartridge-positioning apparatus for an endless magnetic tape cartridge player, wherein a tape cartridge is laterally inserted in a player housing and automatically moved into a play position and back from the play position into a nonplay position to end the play of the cartridge.

Another object of the invention is to provide a tape-cartridge-positioning apparatus for an endless magnetic tape cartridge player, having a cartridge moving lever engageable with the cartridge inserted in the player housing and initially set in the nonplay position for moving the cartridge from the nonplay position into the play position and back into the nonplay position and reciprocally movable in the direction perpendicular to the insertable movement of the cartridge, the cartridge moving lever being reciprocally moved by use of a rotational force of a rotary capstan for driving the tape in the cartridge.

Still another object of the invention is to provide a tape-cartridge-positioning apparatus for an endless magnetic tape cartridge player, wherein in response to operation of a start switch for instructing initiation of the play of the cartridge a stopper means which retains the cartridge-moving lever in a predetermined first position releases retention of the lever, the lever is automatically moved from the first position to a second position whereby the cartridge is moved from the nonplay position to the play position to effect the play of the cartridge.

Yet another object of the invention is to provide a tape cartridge positioning apparatus for an endless magnetic tape cartridge player, wherein in response to operation of a stop switch for instructing termination of the play of the cartridge the stopper means which retains the cartridge moving lever in the second position releases retention of the lever, the lever is automatically moved from the second position to the first position whereby the cartridge is moved into the nonplay position to end the play of the cartridge.

According to the present invention, the tape cartridge is automatically reciprocated between the play position and the nonplay position whereby much effort is not required to insert or withdraw the cartridge in or from the player, and the cartridge may be located in the play position without relying on a notch or the like to provide much convertibility for the cartridge. Since the cartridge is laterally inserted in the player housing to provide no projective portion from the player housing, there is no harm to human body, and the magnetic head is located adjacent an opening in the player housing to readily check a spot or stain on the head and wipe out the same. This apparatus may be economically manufactured since the cartridge moving lever is adapted to be moved by use of a rotational force of the capstan.

These and other objects of the invention will be apparent from the following description and accompanying drawing in which:

DESCRIPTION OF THE PREFERRED EMBODIMENTS

Figure 1:
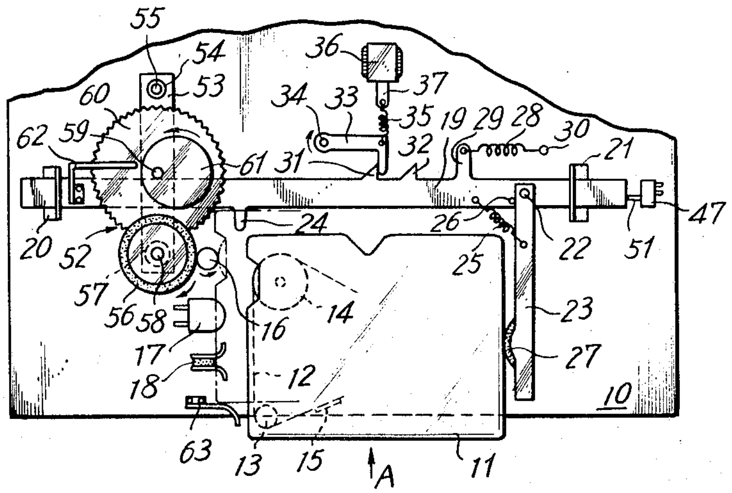
FIG. 1 is a representation schematically showing one embodiment of a tape-cartridge-positioning apparatus according to the present invention.

Referring now to the drawings, and in particularly to FIG. 1, the reference numeral 10 indicates a horizontal deck which is provided within a player housing (not shown) for a tape cartridge player playing an endless magnetic tape cartridge 11. The cartridge 11 includes a generally rectangular housing with a centrally disposed reel (not shown) on which an endless magnetic tape 12 is wound and unwound in conventional manner. The tape 12 passes over a guide 13 and a pinch roller 14. The guide 13 and the pinch roller 14 are disposed adjacent the leading edge of the cartridge whereat the cartridge sidewall is cut away or disposed with and the tape 12 is extended from the center of the hub of the reel (not shown) about the guide 13 and thence about the pinch roller 14 back to outer periphery of a roll formed by the tape wound about the hub. The tape 12 is provided with a conductive patch or an endmark 15 thereon.

Much of the mechanism disposed beneath the deck 10 is omitted since it forms no part of the present invention. However, there shown on the deck 10 are a capstan 16 for driving the tape 12, a magnetic head 17 adapted to transduce the tape and an endmark detector 18. The capstan 16 is rotatably supported by a suitable bearing (not shown) mounted beneath the deck 10 and upwardly extend through a hole (not shown) bored through the deck 10 and is further adapted to be rotatably driven by an electrical motor (not shown). The endmark detector 18 has a pair of feeler contacts which are electrically separated from each other and are shorted by the conductive patch 15 on the tape 12.

In a conventional endless magnetic tape cartridge player, the tape cartridge is longitudinally inserted in the cartridge player to allow the leading edge thereof to pass through an opening in the player housing. In contrast, according to the present invention, the tape cartridge is adapted to be laterally inserted in the cartridge player. For this reason, the opening in the player housing (not shown) is in a laterally elongated form and dismensioned to receive the cartridge laterally.

The tape-cartridge-positioning apparatus according to the present invention includes a cartridge-moving lever 19 slidably supported by guides 20 and 21 fixed to the deck 10. The lever 19 is provided for moving the cartridge 11 which is inserted in the player housing from the direction as indicated by the arrow A and is laid on the deck 10 toward the player position where the pinch roller 14 abuts against the capstan 16. Pivoted on a pin 22 at one portion of the lever 19 is a rear arm 23, and a front arm 24 projects from the other portion thereof. The rear arm 23 is biased in the clockwise direction by a spring 25 but inward movement of the rear arm is limited by a stopper pin 26 on the lever 19. When the lever 19 is in a first position as shown in FIG. 1, the cartridge which is inserted in the direction of the arrow A and rests on the deck 10, is interposed between the rear arm 23 and the front arm 24. The rear arm 23 is provided with a pad member 27 which contacts the cartridge 11 at the rear edge thereof.

Figure 2:
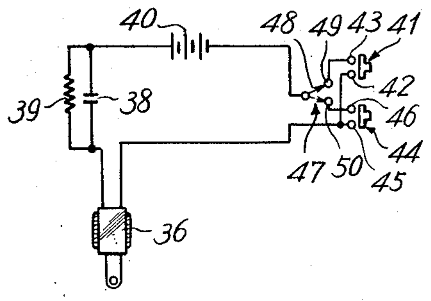
FIG. 2 is a diagram showing a control circuit for the solenoid in FIG. 1.

A comparatively heavy tension spring 28 is interposed between a projecting portion 29 of the lever 19 and a pin 30 on the deck 10 to normally urge the lever in the rightward direction. Rightward movement of the lever 19 due to the tension spring 28 is arrested by engagement of the projection 31 of the lever 19 with a substantially L-shaped stopper lever 33 pivoted by a pin 34 mounted to the deck 10. FIG. 1 shows the cartridge moving lever 19 in a first position upon engagement of the stopper 33 with the projection 31. The stopper lever 33 is urged by a spring (not shown) to maintain an engagement relationship with the projection 31. The stopper lever 33 is connected through a spring 35 with a plunger 37 for a solenoid 36 mounted to the deck 10 and is swung by the plunger 37 to be disengaged from the projection 31 when the solenoid 36 is energized. A control circuit for the solenoid 36 is shown in FIG. 2. The solenoid 36 is provided with an exciting coil (not shown) of which one end is connected through a parallel connection with a condenser 38 and a high-value resistor 39 to one pole of a power source 40, with the other end of the coil being connected to one contact 42 of a manually operated normal-opened start switch 41 for instructing initiation of the play of the cartridge and to one contact 45 of a manually operated normal-opened stop switch 44 for instructing termination of the play of the cartridge. The other contact 43 of the start switch 41 is connected to one fixed contact 49 of a changing switch 47 which is provided on the deck 10 and actuated by the cartridge moving lever 19 while the other contact 46 of the stop switch 44 is connected to the other fixed contact 50 of the changing switch 47. The changing switch 47 includes a common movable contact 48 which is connected to the other electrode of the power source 40 and also selectively connected to the fixed contact 49 or 50. An actuator 51 for the changing switch 47 is depressedly operated by the lever 19 when in the first position to thus allow the movable contact 48 to come in contact with the contact 49 as shown in FIG. 2 whereby the lever 19 is leftwardly moved from the first position to release operation of the actuator 51 at the movable contact 48 is away from the contact 49 and comes in contact with the contact 50. As shown in FIG. 2, the start switch 41 is manually closed to apply the current in pulse fashion from the power source 40 via the condenser 38 to the exciting coil (not shown) of the solenoid 36 thereby energizing the solenoid 36 in pulse fashion. In response to energization of the solenoid 36, the stopper lever 33 is moved to disengage the projection 31. As a result, the cartridge moving lever 19 is slightly moved by the bias of the tension spring 28 in the rightward direction and then leftwardly moved by a lever-moving means as indicated at 52 against the bias of the tension spring 28. The lever moving means 52 includes a swing lever 52 which is swingably provided by a sleeve 54 over a shaft 55 on the deck 10. A rubber covered frictional idler wheel 56 and a gear 57 connected to each other are rotatably supported on an axis 58 on the swing lever 53. The wheel 56 as will be described later is caused to abut against the capstan 16 by rotation of the swing lever 53 from the position as shown to the counterclockwise direction and is rotatably driven by the capstan. Rotatably mounted on an axis 59 on the swing lever 53 are gear 60 and an eccentric cam 61 which are connected with each other, with gear 60 meshing with the gear 57. The gears 57 and 58 constitute a reduction gearing and rotation of the wheel 56 is reduced to be imparted to the cam 61. A trigger arm 62 is mounted on the cartridge-moving lever 19 opposite the cam 61.

When the stopper lever 33 is moved by the solenoid 36 to disengage the projection 31 to slidably move the lever 19 by the bias of the tension spring 28, the end of the trigger arm 62 comes in contact with the cam 61. As a result, the swing lever 53 is counterclockwise biased by the bias of the tension spring 28 to press the wheel 56 against the capstan 16 and the wheel 56 is rotatably driven in the direction as shown by the arrow. Rotation of the wheel 56 is imparted through the reduction gearing to the cam 61, and the cam 61 is also rotated in the direction of the arrow as shown. The end of the trigger arm 62 initially contacts the minimum eccentric portion of the cam 61 and gradually directed to more eccentric portion as the cam 61 is rotated. With rotation of the cam 61, the cartridge-moving lever 19 is leftwardly and gradually moved against the bias of the tension spring 28. The projections 31 and 32 of the lever 19 has inclined portions at left hand thereof so as not to engage the stopper lever 33 when the lever 19 is leftwardly moved. When the maximum eccentric portion of the cam 61 contact the trigger arm 62 as it is rotated, the lever 19 is moved until the projections 31 and 32 are disposed leftwardly of the stopper lever 33. When the cam 61 is further and slightly rotated, the lever 19 is thus rightwardly moved and the project 32 engages the stopper lever 33 to arrest movement of the lever 19. Thus, pressure applied by the tension spring 28 is diminished between the trigger arm 62 and the cam 61 to thus diminish pressure between the wheel 56 and the capstan 16 to stop rotation of the wheel 56.

During the time that the cartridge-moving lever 19 is moved by the lever-moving means 52 from the first position to a second position where the projection 32 engages the stopper lever 33, the rear edge of the cartridge 11 inserted in the player housing is depressed by the rear arm 23 and forwardly advances and is guided by a guide member 63 mounted to the deck 10 and thereby moving into a play position where the cartridge is played by the capstan 16 and the magnetic head 17. Where the lever 19 is moved into the second position, the rear arm 23 is counterclockwise rotated against the bias of the spring 25 to obtain pressure between the capstan and the pinch roller 14 of the cartridge 11 which is moved to the play position by the bias of the spring 25. In FIG. 1, the cartridge is shown by the dot and dash lines as being moved into the play position.

The lever 19 is moved from the first position to the second position to change over the changing switch 47 to allow the movable contact 48 to contact the fixed contact 50 as shown by the dotted lines. With this arrangement, when the cartridge is played, the solenoid 36 is not energized even if the start switch 41 is operated.

The stop switch 44 is operatively closed for terminating the play of the cartridge to energize the solenoid 36 in pulse fashion allowing the stopper lever 33 to move and disengage the projection 32. As a result, the lever 19 is rightwardly moved by the bias of the spring 28 and the trigger arm 62 is caused to come in contact with the cam 61. Therefore, the wheel 56 abuts against the capstan 16 and initiates its rotation while the cam 61 also begins its rotation. When the cam 61 is rotated until the minimum eccentric portion slidably contacts the end of the trigger arm 62, the projection 31 is engaged by the lever 33 and the lever 19 is returned to the first position and prevented from its movement. When movement of the lever 19 is arrested, pressure between the trigger arm 62 and the cam 61 is diminished while pressure between the wheel 56 and the capstan 16 is diminished to end rotation of the wheel 56. When the lever 19 is moved from the second position back into the first position, the cartridge 11 which has been located and played in the play position is retractively moved as the front edge of the cartridge 11 is pressed by the front arm 24, and is moved back into the nonplay position. When the lever 19 is moved back into the first position, the actuator 51 of the changing switch 47 is operated by the lever 19 and the movable contact 48 comes in contact with the fixed contact 49. Next, the start switch 41 is depressedly operated to prepare energization of the solenoid 36. Control for current supply to the solenoid 36 may be made by a unitary switch, however, according to this embodiment advantage derived from the use of the start switch 41, the stop switch 44, and the changing switch 47 is that instruction for the play or ending of the cartridge can be made without fail.

Figure 3:
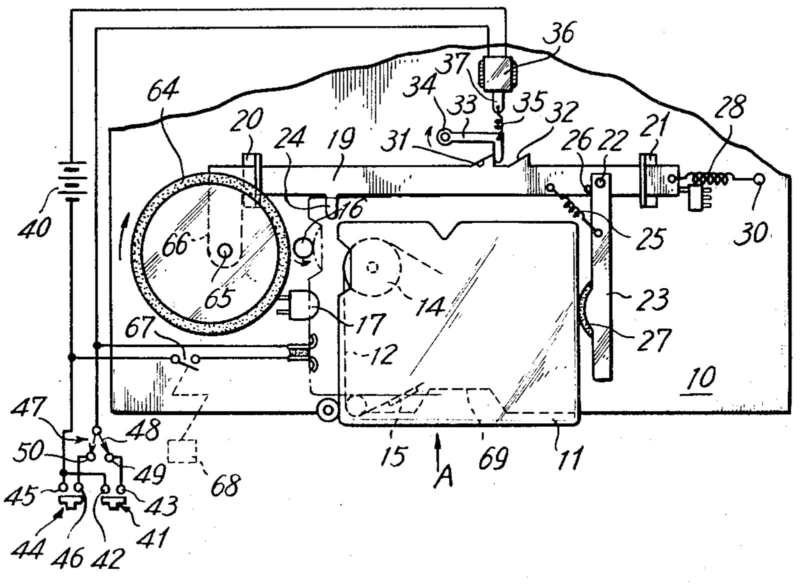
FIG. 3 is a representation schematically showing another embodiment of the tape cartridge positioning apparatus of the invention.

FIG. 3 shows alternative embodiment of the tape-cartridge-positioning apparatus according to the present invention, wherein similar numerals are used to illustrate like parts shown in FIGS. 1 and 2.

The important aspect of difference between the embodiments illustrated in FIG. 3 and FIG. 1 resides in the lever-moving means. The lever-moving means includes a rubber covered eccentric frictional idler wheel 64 rotatably supported by an axis 65 mounted to a bent portion leftwardly of the cartridge moving lever 19. On the other hand, the control circuit for the solenoid 36 has the endmark detector 18 and a switch 67 connected in series with the power source 40 and the solenoid 36. The switch 67 is built in a variable resistor 68 (indicated by the dotted line) for adjustment of reproducing sound volume, incorporated in a reproducing circuit for the tape cartridge player and is adapted to be closed when the variable resistor 68 is operated to minimize the reproducing sound volume.

When the start switch 41 is depressedly operated and closed after the cartridge 11 is set to the nonplay position, the solenoid 36 is energized to allow the stopper lever 33 to move and disengage the projection 31. Therefore, the lever 19 is slightly and rightwardly moved by the bias of the tension spring 28 while the wheel 64 abuts against the capstan 16 and rotatably driven in the direction of the arrow as shown. During the time that the wheel 64 initiate its rotation and rotated through a half-turn, the lever 19 is gradually and leftwardly moved as the wheel 64 is rotated. When the maximum eccentric portion of the wheel 64 passes through the capstan 16, movement of the lever 19 is reversed and assumes the rightward direction, however, movement of the lever 19 is arrested by the projection 32 in engagement with the stopper lever 33, and the lever is retained in the second position. As the lever 19 is retained in the second position, pressure applied by the tension spring 28 between the wheel 64 and the capstan 16 is diminished to end rotation of the wheel 64. In response to movement of the lever 19 from the first position to the second position, the cartridge 11 is caused to move from the nonplay position to the play position and is thus played.

If the variable resistor 68 is operated so as to close the switch 68 when the cartridge 11 is played, the solenoid 36 may be energized in response to passage of the conductive patch 15 on the tape 12 over the detector 18. The solenoid 36 may be also energized in response to closing of the stop switch 44 at any time when desired.

In response to energization of the solenoid 36, the stopper lever 33 is moved to disengage the projection 33, and the lever 19 is rightwardly moved by the bias of the tension spring 28 whereby the wheel 64 abuts against the capstan 16 and rotatably driven by abutment with the capstan 16. As the wheel 64 is rotated, the lever 19 is gradually and rightwardly moved until the projection 31 engages the stopper lever 33. By engagement of the projection 31 with the stopper lever 33, movement of the lever 19 is arrested to diminish pressure between the wheel 64 and the capstan 16, and the wheel 64 ends its rotation in the position where the minimum portion of the wheel 64 is substantially opposite to the capstan 16.

Where the lever 19 is moved back into the first position, the cartridge is moved from the play position and back into the nonplay position and is thus prevented from its play. Numeral 69 indicates a notch which is provided on the deck 10 so as to allow the cartridge to take out from the player housing.

Although the details of the invention has been described by reference to the embodiments, various changes and improvements can be made without limiting to the illustrative embodiments so long as the spirit and the scope of invention is intended within the appended claim.

What is claimed is:

1. A tape-cartridge-positioning apparatus for an endless magnetic tape cartridge player, the player including a player housing having an opening through which an endless magnetic tape cartridge is laterally inserted, and a deck on which the cartridge rests and which carries a rotary capstan for driving the tape in the cartridge and at least one magnetic head adapted to transduce the tape, comprising:

a cartridge-moving lever on the player deck reciprocally movable in the direction perpendicular to the direction that the cartridge is inserted in the player housing and engageable with the cartridge inserted in the player housing and deposited on the deck and for moving the cartridge from a nonplay position where the cartridge is initially inserted in the player housing and rests on the deck into the play position where the capstan is played by the capstan and magnetic head, and back into the nonplay position;

a tension spring biasing the cartridge moving lever in the direction where the cartridge is moved from the play position to the nonplay position;

a stopper means retaining the cartridge-moving lever against the bias of the tension spring in a first position where the cartridge is located in the nonplay position or a second position where the cartridge is located in the play position;

a control means for controlling operation of the stopper means;

a lever-moving means for moving the cartridge-moving lever from the first position to the second position against the bias of the tension spring when the stopper means is moved by the control means to disengage the cartridge-moving lever in the first position and for moving the cartridge-moving lever from the second position to the first position when the stopper means is moved by the control means to disengage the cartridge-moving lever in the second position, said lever-moving means including a frictional idler wheel which is rotatably driven by abutment with said rotary capstan under the influence of the tension spring when the cartridge moving lever is disengaged from the stopper means, the cartridge moving lever being moved in relation to rotation of said wheel.

2. A tape-cartridge-positioning apparatus for an endless magnetic tape cartridge player in accordance with claim 1, wherein said frictional idler wheel of said lever moving means is rotatably provided on a swing lever swingably mounted to said deck, a cam is rotatably mounted to the swing lever, the cam being connected through a reduction gear to the wheel, said cartridge moving lever being provided with a trigger arm which is engageable with the cam under the bias of said tension spring when the lever is disengaged from said stopper means, the wheel abutting against said rotary capstan and being rotatably driven by engagement of the trigger arm with the cam while the cam is also rotated, the cartridge-moving lever being moved by the trigger arm in relation to rotation of the cam.

3. A tape-cartridge-positioning apparatus for an endless magnetic tape cartridge player in accordance with claim 1, wherein said frictional idler wheel of said lever moving means is rotatably and eccentrically provided to a portion of said cartridge-moving lever, and the lever being moved by eccentrical rotation of the wheel.

4. A tape-cartridge-positioning apparatus for an endless magnetic tape cartridge player in accordance with claim 1, wherein said cartridge-moving lever has a front arm and a rear arm to grasp said cartridge, the rear arm pressing the rear edge of the cartridge to move the latter to said play position when the lever is moved from said first position into said second position, the front arm pressing the leading edge of the cartridge to move the latter to said nonplay position when the lever is moved from said second position into said first position.

5. A tape-cartridge-positioning apparatus for an endless magnetic tape cartridge player in accordance with claim 4, wherein said rear arm is swingable and biased by a spring in the direction to press the rear edge of the cartridge, a rotational force of the rear arm by said spring is arrested by a stopper member at a position where the rear arm is parallel to the front wom, when said cartridge-moving lever is moved into said second position and the cartridge is moved into the play position the rear arm being rotated against the bias of said spring, the rear arm brining the cartridge into the play position under the influence of said spring.

6. A tape-cartridge-positioning apparatus for an endless magnetic tape cartridge player in accordance with claim 1, wherein said stopper means comprises a stopper lever swingably provided on said deck, and a first and second projections formed spacedly away from each other with respect to said cartridge-moving lever and in engageable relationship with the stopper lever when the lever is moved in the direction that said spring is biased, the stopper lever being normally biased to maintain engageable relationship with the projections.

7. A tape-cartridge-positioning apparatus for an endless magnetic tape cartridge player in accordance with claim 6, wherein said control means comprises a solenoid coupled to said stopper lever and moving said stopper lever to disengage said projections when energized, and a control circuit for controlling a current supply to the solenoid.

8. A tape-cartridge-positioning apparatus for an endless magnetic tape cartridge player in accordance with claim 7, wherein said control circuit includes a power source for energizing said solenoid, a manually operated normal-opened start switch for instructing initiation of the play of the cartridge, a manually operated normal-opened stop switch for instructing termination of the play of the cartridge, and a changing switch actuable by said cartridge-moving lever and changeable over to a first situation when the lever is in said first position and to a second situation when the lever is in said second position, the start switch being operatively closed when the changing switch is in the first situation current being applied from the power source through the start switch, the changing switch to the solenoid, the stop switch being operatively closed when the changing switch is in the second situation current being applied from the power source through the stop switch, the changing switch to the solenoid.

9. A tape-cartridge-positioning apparatus for an endless magnetic tape cartridge player in accordance with claim 7, wherein said control circuit comprises a power source for energizing said solenoid, a switch operatively closed at any time when desired, and a detector on said deck having a pair of feeler contacts insulated from each other which are shorted by a conductive foil mounted to said tape, the solenoid, the switch and the detector being together connected in series with the power source.

* * * * *